United States Patent [19]
Huber et al.

[11] Patent Number: 5,107,811
[45] Date of Patent: * Apr. 28, 1992

[54] APPARATUS HAVING A CONTROL MOTOR FOR INTERVENTION INTO A FORCE TRANSMISSION DEVICE

[75] Inventors: Werner Huber, Schwaikheim; Guenter Spiegel, Worms, both of Fed. Rep. of Germany

[73] Assignee: Robert Bosch GmbH, Stuttgart, Fed. Rep. of Germany

[*] Notice: The portion of the term of this patent subsequent to Jun. 4, 2008 has been disclaimed.

[21] Appl. No.: 569,051

[22] Filed: Aug. 17, 1990

[30] Foreign Application Priority Data

Oct. 18, 1989 [DE] Fed. Rep. of Germany ....... 3934737

[51] Int. Cl.⁵ .................... F02D 11/06; F02D 9/00; F02D 1/10
[52] U.S. Cl. .................... 123/399; 123/342
[58] Field of Search ............ 123/342, 361, 399, 400

[56] References Cited

U.S. PATENT DOCUMENTS

| | | | |
|---|---|---|---|
| 4,779,592 | 10/1988 | Takeuchi et al. | 123/399 |
| 4,848,297 | 7/1989 | Hickmann et al. | 123/342 |
| 4,860,708 | 8/1989 | Yamaguchi et al. | 123/399 |
| 4,919,097 | 4/1990 | Mitui et al. | 123/399 |
| 4,986,238 | 1/1991 | Terazawa | 123/361 |
| 5,020,496 | 6/1991 | Huber et al. | 123/342 |
| 5,060,613 | 10/1991 | Lieberoth-Leden et al. | 123/399 |
| 5,065,722 | 11/1991 | Huber et al. | 123/399 |

FOREIGN PATENT DOCUMENTS 2186024  8/1987  United Kingdom .

Primary Examiner—Tony M. Argenbright
Attorney, Agent, or Firm—Edwin E. Greigg; Ronald E. Greigg

[57] ABSTRACT

An apparatus comprising a control device of a driving engine which can be actuated purely mechanically, for varying the operation of engine as well as via a control motor as needed, independently of the mechanical operation in a direction of reduced output of the driving engine. The apparatus includes a restoring spring which acts upon a first driver element connected to the operating element. Since the coupling spring is not subject to tension exerted by the restoring spring, the coupling spring can be embodied as relatively weak. The apparatus is particularly well-suited to motor vehicles equipped with traction control.

25 Claims, 1 Drawing Sheet

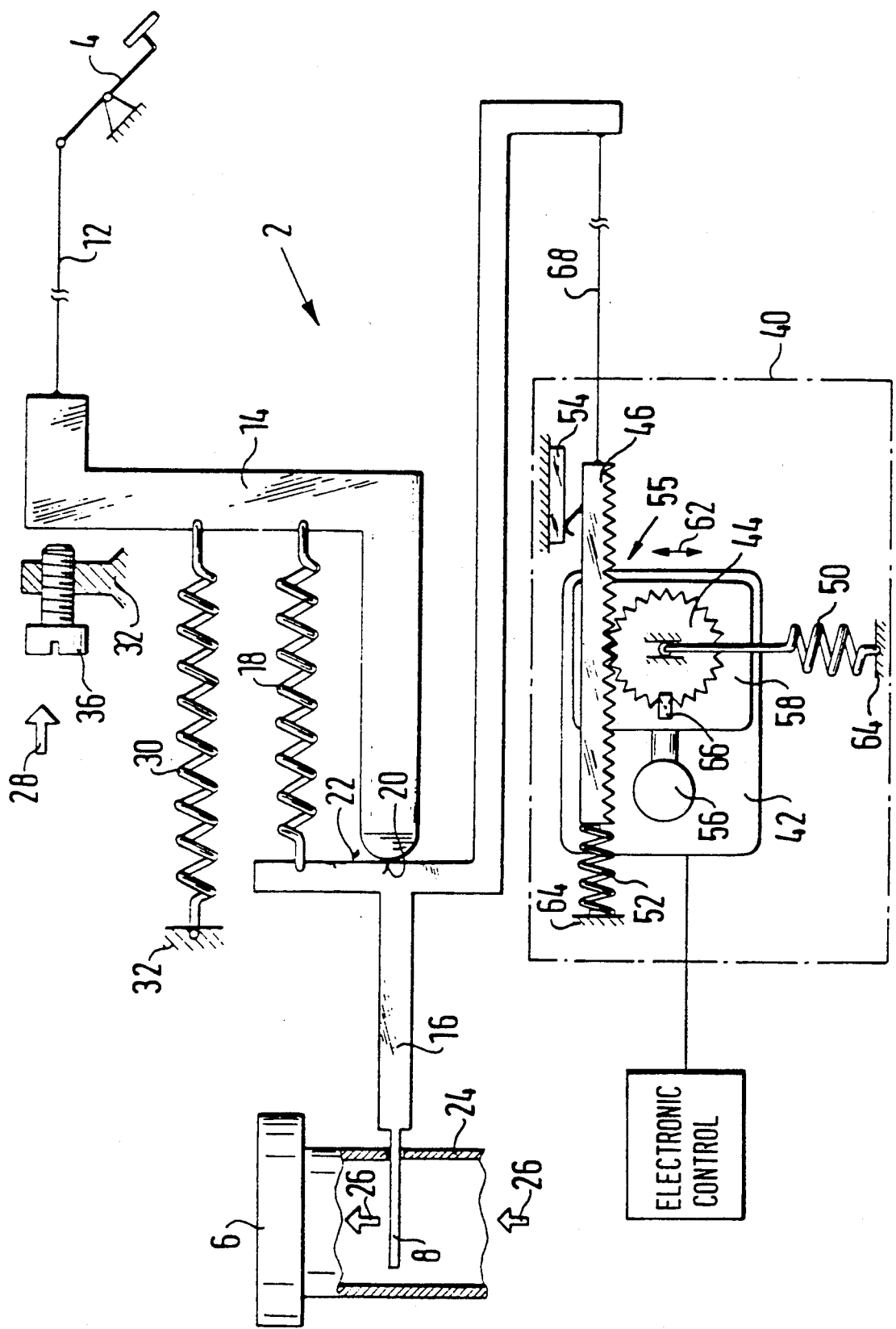

5,107,811

APPARATUS HAVING A CONTROL MOTOR FOR INTERVENTION INTO A FORCE TRANSMISSION DEVICE

RELATED APPLICATIONS

This application relates to subject matter generally similar to other applications filed simultaneously by the same assignee, the applications being Ser. Nos. 569,050, and 568,813, respectively, and now U.S. Pat. Nos. 5,065,722 and 5,020,496.

BACKGROUND OF THE INVENTION

The invention is based on an apparatus having a control motor for intervention into a force transmission device, between an operating element and a control device that determines the output of a driving engine, as defined hereinafter.

For various closed-loop control tasks in driving engines, intervention into a force transmission device between the operating element, such as a gas pedal, and the control device, such as a throttle valve in an Otto engine or a control lever of a Diesel engine or the like, is necessary. One reason for an adjustment may for instance be to avoid slip between wheels of a motor vehicle that are driven by the driving engine and a road surface.

A known apparatus includes a first driver element connected to the operating element, a second driver element, connected to the control device upon which control motor can act under certain circumstances. A coupling spring acts on one end on the first driver element and o the other on the second driver element, with the tendency to actuate a coupling stop of one driver element toward a coupling stop of the other driver element.

A restoring spring connected to the control device acts upon the control device in a direction of reduced output of the driving engine. In an unregulated operating state, action can be exerted upon the control device in the direction of greater output of the driving engine by the operating element, via the two driver elements. The operating element in this process operates counter to a restoring spring. The force of the restoring spring acts via the two driver elements and the coupling spring as far as the operating element. To prevent the two coupling stops from separating from one another in the unregulated operating state, the coupling spring must be embodied as markedly stronger than the restoring spring. The necessarily strong coupling spring leads to a relatively voluminous and heavy construction.

It is disadvantageous that when the control motor is triggered, the strong coupling spring tenses, causing considerable forces to be fed back to the operating element. An adjusting force to be brought to bear by the control element is relatively great.

OBJECT AND SUMMARY OF THE INVENTION

The apparatus according to the invention has an advantage that because of the selected disposition of a restoring spring, the coupling can be made relatively weak. The force of the restoring spring is advantageously not carried via the coupling spring. The coupling spring serves essentially merely to compensate for frictional forces. The load on the coupling spring is advantageously small, and as a result the coupling spring and hence the entire apparatus according to the invention can be made relatively small and lightweight.

The adjusting force to be brought to bear by the control motor is advantageously less than before as a result, and feedback on the operating element is likewise less than in an embodiment in accordance with the prior art.

The disposition of the actual-value transducer in the final control element simplifies detection of the control position in an advantageous manner, because the expenditure for control and electrical purposes is reduced.

Because of the force transmission means between the final control element of the second driver element, the final control element can advantageously be disposed at virtually any arbitrary point away from the control device.

The automatic intervention of the operative member of the control motor into the coupling element reduces the number of components and thus advantageously simplifies the apparatus.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows an exemplary embodiment of the invention in simplified form.

DESCRIPTION OF THE PREFERRED EMBODIMENTS

The structure and operation of an apparatus according to the invention in an engine, in particular in a vehicle, having a control motor for intervention into a force transmission device 2 between an operating element 4 and a control device 8 that determines the output of a driving engine 6, will now be described in further detail in terms of a preferred exemplary embodiment shown in the drawing.

The apparatus according to the invention can be used in any machine containing a driving engine 6, in which closed-loop control of the driving engine 6 is to be effected. The machine may either be mounted in stationary fashion or may for instance be a self-propelled machine or in other words a vehicle. Although not restricted solely to this, it will be assumed in the description of the exemplary embodiment, for the sake of simplicity, that the apparatus according to the invention is to be installed in a vehicle having an Otto engine.

The force transmission device 2 substantially includes a transmission element 12, a first driver element 14, a second driver element 16 and a coupling spring 18.

The first driver element 14 is connected to the operating element 4 by the transmission element 12, and the control device 8 is connected to the second driver element 16. The coupling spring 18 acts at one end on the first driver element 14 and at the other end on the second driver element 16, in such a way that both driver elements 14, 16 are urged to execute a motion relative to one other until a first coupling stop 20 of the first driver element 14 comes to rest against a second coupling stop 22 of the second driver element 16.

The control device 8 is for instance a throttle valve 8 installed in an intake tube 24. Depending on the control position of the throttle valve 8, a flow, represented symbolically by arrows 26, for instance of a mixture flowing through the intake tube 24 to the driving engine 6 can be varied. In this way, the output of the driving engine 6 is controlled via the control position of the throttle valve 8. Actuation of the throttle valve 8 in the direction of an arrow 28 shown in the drawing represents an increase in the output of the driving engine 6, and actuation of the throttle valve 8 counter to the direction of the arrow 28 represents a reduction in the output of the driving engine 6. By means of the operating element 4, the control device 8 can be actuated via the force transmission device 2 in the direction of the arrow 28. The control device 8 can be actuated counter to the direction of the arrow 28 by a restoring spring 30 provided on the transmission device 2. The restoring spring 30 acts at one end on a wall 32 and on the other on the first driver element 14. The restoring spring 30 acts on the first driver element 14 counter to the direction of the arrow 28. Depending on the actuation of the operating element 4, the restoring spring 30 can actuate the driver elements 14, 16 and the throttle valve 8 counter to the direction of the arrow 28, until one of these latter elements comes to rest on an adjustable idling stop 36. In the exemplary embodiment, the first driver element 14 can be made to contact the idling stop 36.

A coupling force of the coupling spring 18 is dimensioned such that without influence by a final control element 40 on the force transmission device 2, the first coupling stop 20 of the first driver element 14 rests constantly on a second coupling stop 22 of the second driver element 16, and a control position of the operating element 4 can be transmitted to the control device 8 via the force transmission device 2.

Additionally, there is also the final control element 40. The final control element 40 substantially includes a control motor 42 having an operating member 44, a coupling element 46, an uncoupling spring 50, and optionally a tension spring 52 and an actual-value transducer 54. The operative member 44, the coupling element 46 and the uncoupling spring 50 are essential components of an actuatable coupling 55.

The control motor 42 is a rotary motor, for example. The operative member 44 may be the rotor shaft of the control motor 42 directly, for example, or a gear 58 can be interposed between the operative member 44 and an actual motor 56 of the control motor 42. In this latter case, the operative member 44 is an output shaft of the gear 58.

The operative member 44 of the control motor 42 is displaceable transversely to the actuation directions represented by the arrow 28. The displacement direction of the operative member 44 is represented by a double arrow 62. The double arrow 62 extends transversely to the arrow 28. Depending on the direction in which the operative member 44 is displaced, a set of teeth of the operative member 44 comes to mesh with a set of teeth of the coupling element 46. The uncoupling spring 50 acts at one end on a housing 64 of the final control element 40 and at the other on the operative member 44, such that the uncoupling spring 50 tends to bring the set of teeth of the operative member 44 out of engagement with the set of teeth of the coupling element 46. The uncoupling spring 50 acts upon the operative member 44 parallel to the double arrow 62.

The final control element 40 further includes a friction member 66. The friction member 66 acts upon the operative member 44. The friction member 66 is disposed such that upon counterclockwise rotation of the operative member 44, because of the frictional force between the friction member 66 and the operative member 44 and because of the torque of the control motor 42, a force acts in the displacement direction of the operative member 44 symbolized by the double arrow 62 in such a manner that the operative member 44 is displaced in the direction of the coupling element 46. In other words, upon counterclockwise rotation of the operative member 44, the set of teeth of the operative member 44 comes to mesh with the set of teeth of the coupling element 46. As soon as the operative member 44 has entered engagement with the coupling element 46, then upon further counterclockwise rotation of the operative member 44 the coupling element 46 is likewise actuated counter to the direction of the arrow 28.

An essential feature of the coupling 55 shown is that it automatically closes as soon as the control motor 42 starts up and rotates the operative member 44 counterclockwise. The opening of the coupling 55 is likewise effected automatically, as soon as the torque of the control motor 42 drops below a pre-determined value. The uncoupling spring 50 then puts the operative member 44 out of engagement with the coupling element 46. In order that the coupling 55 will open reliably, the polarity of the control motor 42 can optionally be reversed briefly and the operative member 44 can be briefly rotated clockwise.

An automatically closing coupling 55 can also be achieved by providing an axially displaceable rotor shaft 44, for instance, as the operative member 44 of the control motor 42. The rotor shaft 44 may for instance be embodied such that a magnetic field of the control motor 42, which sets the rotor shaft 44 into rotation, also axially displaces the rotor shaft 44 in such a way that the rotor shaft 44 comes to engage the coupling element 46. When the magnetic coil of the control motor 42 is not excited, the uncoupling spring 50 displaces the rotor 44 in the opposite direction and moves the rotor shaft 44 out of engagement with the coupling element 46.

The rotor shaft 44 of the control motor 42 can also form a so-called pre-engaged drive. Once again the coupling 55 is automatically closed whenever there is current in the control motor 42, and opened whenever there is no current in the control motor 42.

The coupling 55 may also include a separate electromagnet. Thus the coupling 55 can be actuated as needed independently of the control motor 42.

An actuation of the coupling element 46 counter to the direction of the arrow 28 is transmitted to the second driver element 16 via a transmission means 68. The coupling element 46 of the final control element 40 is connected to the second driver element 16 of the force transmission device 2 via the transmission means 68. The transmission means 68 may be a rod assembly, a Bowden cable, a sheathed cable, or the like. If the transmission means 68 is a Bowden cable or a sheathed cable, for instance, then the tension spring 52 provided in the final control element 40 and acting upon on the intermediate part 54 counter to the direction of the arrow 28 assures a minimum tension in the transmission means 68; that is, the tension spring 52 prevents sagging of the sheathed cable, for instance. The tension spring 52 may also be dispensed with, depending on the embodiment of the transmission means 68, for instance if it is a rod assembly. The coupling 55 and the transmission means 68 may be embodied such that the transmission of forces in both actuation directions is possible. This enables adjustment of the control device 8 by the control motor 42 both in the direction of reduced output and in the direction of increased output of the driving engine 6.

With the aid of the actual-value transducer 54, a control position of the coupling element 46 of the final control element 40, and thus, because of the transmission means 68, at least indirectly a control position of the second driver element 16 and of the control device 8, can be detected. In the region of the control device 8, an actual-value transducer is already often provided for detecting a control position of the control device 8, for instance in order to regulate gasoline metering, but for electrical reasons it is poorly suited to detecting the control position of the control device 8 for the sake of triggering the control motor 42. Since cramped installation conditions often prevail in the region of the control device 8, it is particularly favorable to dispose the actual-value transducer 54 in the region of the final control element 40. For safety reasons, for instance, it may also be favorable to provide a plurality of actual-value transducers 54.

In the apparatus according to the invention, a distinction can be made between two operating states. The first operating state is the unregulated operating state. In the first operating state, the control device 8 can be moved into any desired control position by the operating element 4 without influence by the final control element 40. The control motor 42 is not triggered, and the set of teeth of the operative member 44 is out of engagement with the coupling element 46. In other words, the coupling 55 is opened. Because of the transmission means 68 and the because of the optionally present tension spring 52, the coupling element 46 moves in the same direction as the second driver element 16 upon actuation of the operating element 4.

As needed, the coupling 55 can also be omitted. If the coupling 55 is absent, then in the first operating state the operating element 4 necessarily, in addition to actuating the control device 8, also actuates the operative element 44 of the final control element 40.

Upon actuation of the control device 8 by the operating element 4 in the direction of the arrow 28, the output produced by the driving engine 6 is increased. In this process it may happen that sensors, not shown, detect slip between driven wheels, not shown, and some road surface. The slip is highly undesirable. To avoid slip, the control motor 42 of the final control element 40 is triggered via electronics, not shown. In that case, the apparatus according to the invention operates in its second operating state, which can accordingly be called the regulated operating state. In the second operating state, the operative element 44 rotates counterclockwise, driven by the control motor 42. Because of the friction element 66, a force counter to the uncoupling spring 50 is simultaneously generated, which puts the set of teeth of the operative member 44 in engagement with the set of teeth of the coupling element 46. If the operative member 44 is rotated counterclockwise beyond this, then the coupling element 46 is actuated counter to the arrow 28. With the transmission means 68, the motion of the coupling element 46 is transmitted to the second driver element 16 and to the control device 8. In other words, the control device 8 is actuated in the direction of lesser output of the driving engine 6. In this process the coupling stop 22 of the second driver element 16 lifts away from the coupling stop 20 of the first driver element 14, and the load on the coupling spring 18 increases. The control device 8 is actuated far enough counter to the direction of the arrow 28 that the sensors (not shown) do not detect any inadmissible slip between the drive wheels and the road surface.

Depending on the embodiment, the transmission means 68 may be located very flexibly. The fact that the coupling element 46 and the control motor 42 in particular can be disposed spatially independently of the intake tube 24 advantageously makes installation of the intake tube 24 and control device 8 considerably simpler. It is furthermore particularly advantageous to combine the coupling element 46 and the control motor 42 with the operative member 44 and the uncoupling spring 50, or at least some of these parts, in the final control element 40. The final control element 40 is preferably a compact unit, which can be disposed if needed with variable spacing with respect to the intake tube 24. The connection between the final control element 40 and the force transmission device 2 is effected by the transmission means 68. The tension spring 52 is preferably selected to be so weak that at most it can overcome a friction in the region of the coupling element 46 and transmission means 68, but cannot exert any significant influence on the force transmission device 2 and in particular on the coupling spring 18. Because of the relatively weak tension spring 52, the coupling spring 18 need not be embodied any stronger.

In an apparatus according to the prior art, a restoring spring connected to the control device acts in the direction of reduced output of the driving engine. The force of the restoring spring is transmitted from the second driver element to the first driver element via a coupling spring that generates a coupling force. To prevent the two driver elements from separating from one another in the unregulated operating state, the coupling spring must be embodied as markedly stronger than the restoring spring. This leads to a voluminous, heavy construction. To enable accommodating the necessarily strong coupling spring within an acceptable volume, a very rigid coupling spring is necessarily used. In other words, the coupling spring has a high spring rate. If the two driver elements are separated from one another, the load on the coupling spring increases. At the same time, the force of the restoring spring that promotes the separation may drop. Since the coupling spring has a strong spring rate, the coupling force of the coupling spring increases sharply upon deflection. As a consequence, a strong force exerted by a final control element is required to separate the second driver element from the first driver element. This force increases sharply with increasing separation. Furthermore, because of the sharp increase in coupling force any influence on an operating element connected to the first driver element is considerable. The strong force of the final control element and the strong influence on the operating element are perceived as annoying.

By comparison, in the apparatus according to the invention, the force of the restoring spring 30 is not carried via the coupling spring 18. Here the coupling spring 18 serves essentially only to compensate for frictional forces. Thus a slight coupling force of the coupling spring 18 is adequate, and the coupling spring 18 can be embodied as soft, with an acceptable required volume. In other words, the coupling spring 18 has a low spring rate. The final control element in the regulated operating state must therefore separate the second driver element 18 from the first driver element 14 counter to the advantageously weak coupling spring 18. Since the spring rate of the coupling spring 18 can be less than in the version known before, and since in the apparatus according to the invention the force of the restoring spring 30 does not vary in the regulated operating state, then the force to be brought to bear by the final control element 40, even if the two coupling stops 20, 22 separate widely from one another, increases only relatively weakly, in contrast to the apparatus known previously. Because of the relatively weak increase in coupling force of the coupling spring 18, the influence on the operating element 4 connected to the first driver element 14 is advantageously relatively slight.

The apparatus according to the invention has been described in terms of an exemplary embodiment having substantially linear directions of motion parallel to the arrow 28. In another exemplary embodiment of the same apparatus according to the invention, at least some individual components do not move linearly but instead are pivotably supported. A motion in the direction of the arrow 28 then represents rotation in one direction, and a motion counter to the direction of the arrow 28 represents rotation in the opposite direction. Since the control device 8 is typically rotatably supported, it is a logical option to support the other components rotatably as well.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United Sates is:

1. An apparatus having a control motor (42) for intervention into a force transmission device (2) between an operating element (4) and a control device (8) which determines the output of a driving engine, wherein the operating element is operatively connected to a first driver element (14) and the control device is operatively connected to a second driver element (16), a coupling spring (18) is provided in which a first end of said coupling spring acts on the first driver element and a second end of said coupling spring acts on the second driver element such that the first and second driver elements are urged to execute a motion relative to one another until a coupling stop (20, 22) of one driver element comes to rest on a coupling stop (20, 22) of the other driver element, said control motor (42), upon a desired intervention, can act upon the second driver element (16) in a direction of reducing the output of the driving engine via a flexible transmission means (68) connected thereto and to said second driver element and includes a restoring spring (30) that acts upon the first driver element (14) in a direction of a reduction in output of the driving engine (6).

2. An apparatus as defined by claim 1, in which the second driver element (16) is integrally connected to the control device (8).

3. An apparatus as defined by claim 1, in which said control motor (42) is disposed in a final control element (40) separated from the control device (8).

4. An apparatus as defined by claim 2, in which said control motor (42) is disposed in a final control element (40) separates from the control device (8).

5. An apparatus as defined by claim 1, which includes a final control element (40), and said final control element (40) includes at least one actual-value transducer (54), with which a control position of the second driver element (16) can be detected.

6. An apparatus as defined by claim 2, which includes a final control element (40), and said final control element (40) includes at least one actual-value transducer (54), with which a control position of the second driver element (16) can be detected.

7. An apparatus as defined by claim 3, in which said final control element (40) includes at least one actual-value transducer (54), with which a control position of the second driver element (16) can be detected.

8. An apparatus as defined by claim 4, in which said final control element (40) includes at least one actual-value transducer (54), with which a control position of the second driver element (16) can be detected.

9. An apparatus as defined by claim 1, in which a coupling (55) is provided between the control motor (42) and the second driver element (16).

10. An apparatus as defined by claim 2, in which a coupling (55) is provided between the control motor (42) and the second driver element (16).

11. An apparatus as defined by claim 3, in which a coupling (55) is provided between the control motor (42) and the second driver element (16).

12. An apparatus as defined by claim 5, in which a coupling (55) is provided between the control motor (42) and the second driver element (16).

13. An apparatus as defined by claim 9, in which the coupling (55) is a part of a final control element (40).

14. An apparatus as defined by claim 10, in which the coupling (55) is a part of a final control element (40).

15. An apparatus as defined by claim 11, in which the coupling (55) is a part of the final control element (40).

16. An apparatus as defined by claim 12, in which the coupling (55) is a part of the final control element (40).

17. An apparatus having a control motor (42) for intervention into a force transmission device (2) between an operating element (4) and a control device (8) which determines the output of a driving engine, wherein the operating element is operatively connected to a first driver element (14) and the control device is operatively connected to a second driver element (16) which is integrally connected to said control device (8) a coupling spring (18) is provided in which a first end of said coupling spring acts on the first driver element and a second end of said coupling spring acts on the second driver element such that the first and second driver elements are urged to execute a motion relative to one another until a coupling stop (20, 22) of one driver element comes to rest on a coupling stop (20, 22) of the other driver element, said control motor (42), upon a desired intervention, can act upon the second driver element (16) in a direction of reducing the output of the driving engine and includes a restoring spring (30) that acts upon the first driver element (14) in a direction of a reduction in output of the driving engine (6).

18. An apparatus having a control motor (42) for intervention into a force transmission device (2) between an operating element (4) and a control device (8) which determines the output of a driving engine, wherein the operating element is operatively connected to a first driver element (14) and the control device is operatively connected to a second driver element (16), a coupling spring (18) is provided in which a first end of said coupling spring acts on the first driver element and a second end of said coupling spring acts on the second driver element such that the first and second driver elements are urged to execute a motion relative to one another until a coupling stop (20, 22) of one driver element comes to rest on a coupling stop (20, 22) of the other driver element, said control motor (42), upon a desired intervention, can act upon the second driver element (16) in a direction of reducing the output of the driving engine and includes a restoring spring (30) that acts upon the first driver element (14) in a direction of a reduction in output of the driving engine (6), a coupling (55) is provided between the control motor (42) and the second driver element (16), in which said coupling (55) includes an operative member (44) and a coupling element (46), wherein a control motion of the control motor (42) is transmitted to the control device (8) via the operative member (44) via the coupling element (46) and the second driver element (16), and the operative member (44) is brought into engagement with the coupling element (46) by the control member (42) counter to an uncoupling spring (50).

19. An apparatus as defined by claim 18, in which the second driver element (16) is firmly connected to the control device (8).

20. An apparatus as defined by claim 18, in which said control motor (42) is disposed in a final control element (40) separated from the control device (8) and the final control element (40) is connected to the second driver element (16) via a transmission means (68).

21. An apparatus as defined by claim 20, in which said final control element (40) includes at least one actual-value transducer (54), with which a control position of the second driver element (16) can be detected.

22. An apparatus as defined by claim 18, in which the coupling (55) is a part of a final control element (40).

23. An apparatus as defined by claim 19, in which the coupling (55) is a part of a final control element (40).

24. An apparatus as defined by claim 20, in which the coupling (55) is a part of the final control element (40).

25. An apparatus as defined by claim 21, in which the coupling (55) is a part of the final control element (40).

* * * * *